US009198062B2

(12) United States Patent
Breuer et al.

(10) Patent No.: US 9,198,062 B2
(45) Date of Patent: Nov. 24, 2015

(54) METHOD OF DETECTING A LOSS OF SERVICE AVAILABILITY, IN PARTICULAR A JAMMING TRANSMITTER AND/OR AN OUT OF SERVICE SITUATION, AFFECTING A COMMUNICATION USER EQUIPMENT, USER EQUIPMENT AND EVALUATION UNIT WITH INTERFACES TO THE USER EQUIPMENT

(75) Inventors: Volker Breuer, Botzow (DE); Bernd Rohl, Berlin (DE)

(73) Assignee: GEMALTO M2M GMBH, Munich (DE)

( * ) Notice: Subject to any disclaimer, the term of this patent is extended or adjusted under 35 U.S.C. 154(b) by 304 days.

(21) Appl. No.: 13/883,032

(22) PCT Filed: Nov. 16, 2011

(86) PCT No.: PCT/EP2011/070283
§ 371 (c)(1),
(2), (4) Date: May 2, 2013

(87) PCT Pub. No.: WO2012/066053
PCT Pub. Date: May 24, 2012

(65) Prior Publication Data
US 2013/0215764 A1    Aug. 22, 2013

(30) Foreign Application Priority Data
Nov. 16, 2010    (EP) .................................... 10191430

(51) Int. Cl.
*H04W 24/04* (2009.01)
*H04B 1/7097* (2011.01)
(Continued)

(52) U.S. Cl.
CPC ............ *H04W 24/04* (2013.01); *H04B 1/7097* (2013.01); *H04B 1/7103* (2013.01); *H04K 3/22* (2013.01); *H04K 2203/16* (2013.01)

(58) Field of Classification Search
CPC ..................................................... H04W 24/04
USPC ............................................................ 370/242
See application file for complete search history.

(56) References Cited

U.S. PATENT DOCUMENTS 8,565,439 B2 * 10/2013 Girard et al. .................. 380/287
2007/0224963 A1 * 9/2007 Moscovitz et al. ........... 455/296

FOREIGN PATENT DOCUMENTS

CA    2 433 242 A1    1/2004
CN      1514559 A     7/2004
(Continued)

OTHER PUBLICATIONS (3GPP TS 25.133 version 7.14.0 Release 7); ETSI TS 125 133; ESTI Standard, European Telecommunications Standards Institute (ETSI),France; vol. 3-R4, No. V7.14.0; Mar. 1, 2009.*
(Continued)

*Primary Examiner* — Dang Ton
*Assistant Examiner* — Mewale Ambaye
(74) *Attorney, Agent, or Firm* — Ware, Fressola, Maguire & Barber LLP

(57) ABSTRACT

The invention relates to a method of detecting a jamming transmitter affecting a communication user equipment, wherein said communication user equipment (UE) and a number of base node stations (BNS) are components of a cellular code division multiple access (CDMA) based radio network (RN), wherein a communication signal unit (SU) is correlated with a pseudonoise spread code (SC) in a serving cell coverage area (CA) of a serving base node station (sBNS) and transmitted as a pseudonoise chip (CHI) in a multiple shared communication frequency channel spectrally located between an upper frequency and a lower frequency of a communication frequency band (FB I-XIX) and the pseudonoise spread code (SC) is received by the communication user equipment (UE) as a serving pseudonoise spread code (sSC) from said serving base node station (BNS) in a serving downlink channel (sCPICH).

23 Claims, 4 Drawing Sheets

(51) Int. Cl.
*H04B 1/7103* (2011.01)
*H04K 3/00* (2006.01)

(56) References Cited

FOREIGN PATENT DOCUMENTS

| EP | 1 168 689 | A1 | 1/2002 |
|---|---|---|---|
| JP | 2000508496 | A | 7/2000 |
| JP | 2004172953 | A | 6/2004 |
| JP | 2009278536 | A | 11/2009 |
| JP | 2010041679 | A | 2/2010 |
| WO | 00/62437 | A1 | 10/2000 |
| WO | 2007/019814 | A1 | 2/2007 |

OTHER PUBLICATIONS

"Universal Mobile Telecommunication System (UMTS); Requirements for support of radio resource management (FDD) (3GPP TS 25.133 version 7.14.0 Release 7); ETSI TS 125 133;" ESTI Standard, European Telecommunications Standards Institute (ETSI), Sophia Antipolis Cedex, France; vol. 3-R4, No. V7.14.0; Mar. 1, 2009; paragraph [4.2.2.1] through paragraph [4.2.2.4]; paragraph [09.2] through paragraph [9.2.1].

\* cited by examiner

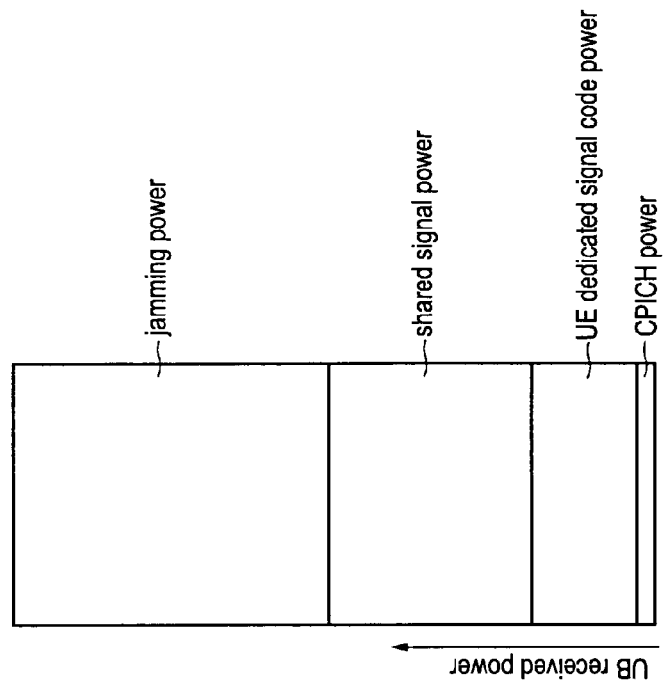
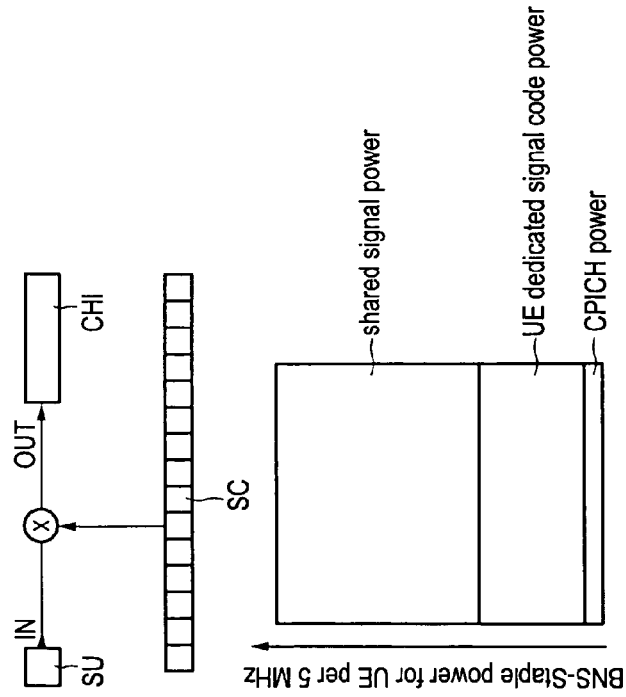

METHOD OF DETECTING A LOSS OF SERVICE AVAILABILITY, IN PARTICULAR A JAMMING TRANSMITTER AND/OR AN OUT OF SERVICE SITUATION, AFFECTING A COMMUNICATION USER EQUIPMENT, USER EQUIPMENT AND EVALUATION UNIT WITH INTERFACES TO THE USER EQUIPMENT

CROSS REFERENCE TO RELATED APPLICATIONS

This application is the U.S. National Stage of International Application Number PCT/EP2011/070283 filed on Nov. 16, 2011 which was published in English on May 24, 2012 under International Publication Number WO 2012/066053 and claims priority under 35 USC §119 to European Patent Application No. 10191430.7 filed on Nov. 16, 2010, which applications are hereby incorporated by reference in their entirety.

TECHNICAL FIELD

The present invention relates to a method of detecting a loss of service availability, in particular a jamming transmitter and/or an out of service situation, affecting a communication user equipment. The present invention also relates to a user equipment configured to execute the said method and an evaluation unit with interfaces to the user equipment and with an application configured to execute said method.

BACKGROUND OF THE INVENTION

Contemporary cellular radio networks are known since many years now and are based on different technologies. The broadest coverage still is held by the global system for mobile communications according to the so called GSM standard. A user equipment in such cellular network can move freely and may be handled over to various cells of the GSM networks as for instance described in GSM standard specification 3GPP ETSI TS 51.010 or the like.

Contemporary radio networks are based on a cellular code division multiple access (CDMA) as for instance realized in the universal mobile telecommunication system (UMTS). The latter is increasingly important for security applications like camera systems or the like.

Generally, a user equipment in radio networks can be subject of being affected by a jamming transmitter—jamming in this context generally is performed by an instrument preventing a user equipment from receiving signals from its base station. In use the jammer effectively disables cellular phones mostly by broad frequency interference with communication frequencies of the user equipment at high power level. Whereas some jammer applications are meant to be legal for instances in places where a phone call is to be suppressed due to silence conditions, other jammers are applied during misuse for instances to interrupt security applications of user equipment or the like. Jammers are available for jamming GSM and also UMTS frequencies. However, jamming detecting and preventing solutions are known up to date basically only against GSM jammers. In this regard, it should be recognized that the primary aim of an anti-jamming solution is to undoubtfully detect a jamming attack rather than preventing the same.

An anti-jamming solution is known from WO 2007/019814 which however is restricted to the GSM standard. Therein a method for detecting a jamming transmitter affecting a communication terminal is described wherein receipt of radio channel signal levels are evaluated at periodic intervals on a signalling channel. In the case that the communication terminal detects a radio channel signal level that exceeds a predefined threshold value in the signalling channel but is nevertheless unable to decode a message content of a message, then this state is interpreted as an interference state and an alarm signal is emitted. The problem related with this GMS anti-jamming solution is its fundament on a predefined threshold value in the signalling channel and the receipt of a message content. These features are somewhat specific for the GMS technology, however, less suited in the UMTS technology. More specifically it turns out that an anti jamming solution in the frame of a cellular code division multiple access based radio network is much more demanding. The state of dealing with disturbances in a communication frequency band of a user equipment is more or less a usual state of operation for a user equipment within a cellular code division multiple access based radio network. In particular, intracell and intercell interferences are generally accepted in a CDMA based radio network as long as a signal can be decoded. Thus, the state of operation naturally is permanently disturbed due to the CDMA based technology. A discrimination of a severe jamming action among these natural disturbances is still a problem to be solved.

The specific reason is as follows. A communication user equipment (UE) and a number of base node stations (BNS) are the basic components of a CDMA based radio network. The radio network (RN) may work in either a frequency division duplex (FDD) or also a time division duplex (TDD) mode. Once a communication link in a serving cell coverage area is provided between the communication user equipment and a serving base node station (sBNS) a communication signal unit (SU) is correlated with a pseudonoise spread code (SC) in a serving cell coverage area (CA) of a serving base node station and transmitted as a pseudonoise chip (CHI) in a multiple shared communication frequency channel. Thus, interferences of multiple base node stations and user equipments in the communication frequency channel are spectrally located between an upper frequency and a lower frequency of a communication frequency band. Consequently, a broad band "jamming like" interference in the multiple shared communication frequency channel can not be considered as an extraordinary event but is on the contrary part of the usual state of operation. Such situation may also occur each time the number of users changes in said frequency band. The similar situation may also occur when a user equipment has a comparatively large or a comparatively small distance to a base node station. Also a similar situation may occur when a user equipment is in the reach of two base node stations in particular vice versa when two user equipments belong to the same or neighbouring cells of the CDMA based radio network. In conclusion, an anti-jamming solution to be successfully implemented in a CDMA based radio network technology is more sophisticating.

In WO 00/62437 a concept for improving a jammer detection sensitivity in a CDMA based communication network is provided wherein a spectral analysis data is used to identify jamming signals having power spectral density characteristics which are distinguishable from those of legitimate subscriber transmissions in the wireless system's frequency band. By using several base stations located near the jamming transmitter, and by comparing the power spectral densities received at those base stations, the location of the jamming transmitter is estimated. Additionally, such spectral analysis data is used to detect aberrant receive spectrum characteristics which may indicate a hardware malfunction or failure. The spectral analysis uses a model of a real-input-data FFT and complex-input-data FFT for a CDMA signal bandwidth C of approximately 1.25 MHz and is based on the assumption that a jammer detection threshold will be set relative to a "noise floor", and it can be concluded that the jammer detection threshold will be the same for the two cases of a FFT. The (in-band) power spectral density P will be the same for either technique, with the power spectral density equaling P/C. But because the jammer power divided equally between a I and a Q branch, the jammer power will be 3 dB less for the real-input-data FFT than in the case of the complex-input-data FFT.

Nevertheless, generally and as compared to the above mentioned GSM solution of WO 2007/019814, a predefined threshold value for a signal level of a specific signalizing channel for a user equipment per se cannot be defined. Either the channel and/or the signal level is continuously changing depending on the surroundings of the network. Also, a message content as such can not be received unless a pseudonoise spread code is received by the communication user equipment. Consequently, without pseudonoise spread code neither transmission nor a content of a message is possible unless—the pseudonoise spread code is known to the user equipment.

In 3GPP TS 25.133, in particular in Chapter 4.2.2.1, it is defined if a user equipment cannot find a suitable UTRA cell, then it is considered to be "out of service area" and shall perform actions according to 3GPP TS 25.331 ("RRC Protocol Specification").

SUMMARY OF THE INVENTION

This is where the invention comes in. The object of which is to provide an effective and reliable method and apparatus for detecting a loss of service availability, in particular a jamming transmitter and/or an out of service situation, affecting a communication user equipment wherein the communication user equipment and a number of base node stations are components of a cellular code division multiple access based radio network like for instance frequency division duplex or time division duplex mode radio network. It is another object of the invention to discriminate between a jamming transmitter and/or an out of service situation, affecting a communication user equipment. It is still another object of the invention to provide such method and apparatus with a more elaborated anti-jamming concept and/or anti-out of service concept allowing also detection of a jamming transmitter and/or an out of service situation on a broad frequency range. In particular, it is a further object of the invention to provide a method and apparatus which allows for a warning against a jamming transmitter and/or an out of service situation, i.e. not only detecting the instant situation of a jamming action and/or an out of service situation but also foreseeing the approach of such situation. The solution to the latter object is of high interest as the solution would naturally allow the method and apparatus to react in due time for instance by sending an alarm before the jamming action and/or an out of service situation interrupts any communication of the user equipment.

As regards the method, the object is achieved by the method of the invention as claimed in claim 1. The method and a developed configurations thereof as outlined above may be implemented by digital circuits of any preferred kind, whereby the advantages associated with the digital circuits may be obtained. In particular one or more a method steps or features of the method can be implemented by one or more means for functionally executing the method step. A single processor or other unit may fulfil the functions of several means recited in the claims—this in particular holds for a user equipment according to the concept of the invention. As regards the apparatus, the object is achieved by particular preferred development of the user equipment as claimed in claim 21. In particular the user equipment has means for verifying the conditions, that (b) the unbiased parameter at the second later time (t2) compared to the first earlier time (t1) has increased and/or verifying that (b) the unbiased parameter at the second later time (t2) compared to the first earlier time (t1) has decreased.

In particular, the concept of the invention also leads to an evaluation unit as defined in claim 24 with interfaces to the user equipment and with an application configured to execute the method of the invention.

The invention starts from the consideration that the user equipment per se and without further measures cannot distinguish between a normal mode frequency disturbance due to interferences originating from the CDMA system as outlined in the introduction on the one hand and a loss of service availability due to external disturbing factors which in the specific situation usually cannot be fixed. The invention has recognized that it is desirable to gather further information about the kind of loss of service availability whereas the processes described in the standard are insufficient and can be improved. In particular the concept of the instant invention provides a basis for discriminating between detecting a jamming transmitter and detecting an out of service situation affecting the communication user equipment. In an out of service situation affecting the communication user equipment the standard is restricted to providing information with regard to an "out of service area" only; however further out of service situation affecting the communication user equipment—apart from the one caused by jamming and apart from "out of service area"—is of interest. These kind of out of service situations affecting the communication user equipment can be defined as an out-of-coverage situation. An out-of-coverage situation can occur rather frequently during all day situations even when the user equipment still is located in principle within the "service area" of a base node station. E.g. an out-of-coverage situation can occur when the user equipment temporarily is in a underground park or the like location wherein a communication signal is low. The information as such is acknowledged by the concept of the invention as particular useful.

Basically for detecting a loss of service availability the invention provides a measurement of a set of power parameters at a first earlier time and a second later time. In particular, the measurement at the first earlier time and the second later time is provided to compare a first value of the power parameters of the first earlier time and a second value of the power parameters of the second later time. Based on the comparison a qualified statement can be given about a loss of service availability and in particular a reason of loss of service availability. In particular the result of the comparison can be used as a basis for discriminating between a jamming situation and/or an out of service situation affecting the user equipment.

According to the invention as a first power parameter a channel biased parameter significant for the received power at the communication user equipment antenna connector is to be measured at a first earlier time and at a second later time. Usually the channel biased parameter for the received power can be considered to origin from a rather reliable and steady source, namely in particular in a nodeB downlink connection. In a preferred development the channel biased parameter is significant for the received power measured in a serving downlink channel. Particularly preferred is a serving downlink channel in form of a pilot channel or the like; in a pilot channel a particular steady nodeB power is transmitted. This holds true in particular for a serving downlink channel wherein the pseudonoise spread code is received by the communication user equipment as a serving pseudonoise spread code from the serving base note station; in particular this is a common pilot channel (CPICH). In particular this also holds true for a serving downlink channel wherein user data and/or control data are received by the communication user equipment from the serving base node station; in particular this is a dedicated physical channel (DPCH).

Whereas the received power, of course, may vary within a certain range, nevertheless in a situation of a loss of service availability in particular the received power in a downlink channel—in particular a channel biased parameter significant for the received power at the communication user equipment antenna connector—will not be detectable or at least less detectable at a second later time as compared to a first earlier time due to the loss of service availability. Thus, by verifying the condition that the biased parameter is not or less detectable at the second later time as compared to the first earlier time a first condition is met for assuming a loss of service availability.

Further the concept of the invention recognized that by measuring an unbiased received wide band power within the bandwidth of the communication user equipment receiver at the communication user equipment antenna connector a valuable basis is given to provide further information about the kind of loss of service availability. By verifying the condition that an unbiased parameter at the second later time as compared to the first earlier time has changed the concept of the invention is able to provide a basis for making a statement about the kind of loss of service availability. In particular if the unbiased parameter has changed significantly the statement can be made. A significant change of the unbiased parameter is considered when a threshold amount of adjustable magnitude is exceeded by the change.

The threshold amount preferably shall be sufficient for affirmation of a receivable pseudonoise spread code. In a particular preferred development the threshold amount basically amounts to or exceeds a spread code gain value wherein the spread code gain value can be of magnitude of for instance 24 dB.

In a particular preferred development—in the case the unbiased parameter at the second later time as compared to the first earlier time has increased and the biased parameter is not or less detectable at the second later time as compared to the first earlier time it is indicated that a jamming transmitter is affecting the communication user equipment. The developed concept relies on the assumption that once the biased parameter is not or less detectable whereas the unbiased parameter has increased a solid basis is given for assuming a jamming situation or at least giving a warning of approach of a jamming situation.

In a particular preferred development—in the case the unbiased parameter at the second later time as compared to the first earlier time has decreased whereas the biased parameter is not or less detectable at the second later time as compared to the first earlier time—it can be indicated that an out of service situation is affecting a communication user equipment. Thus, by discriminating between an increased unbiased parameter at the second later time on the one hand and a decreased unbiased parameter at the second later time on the other hand the development is able to discriminate between a jamming situation on the one hand and an out of service situation affecting the communication user equipment on the other hand.

Further preferably, the level of increase or decrease can be measured at the second later time as compared to the first earlier time. Especially in the case of an out of service situation the decrease leads to a situation where a signal can be no more detectable.

Thus said level can serve as an indicator of reliability; i.e. the higher said level is the more reliable is the discrimination between a jamming situation on the one hand and an out of service situation affecting the communication user equipment on the other hand. In particular a threshold amount for said level can be chosen to be the spreadcode gain value, like e.g. preferably 24 dB.

In particular the indication can be given to an application layer of an evaluation unit which has an interface to the user equipment. By means of the evaluation unit it is possible to provide an information discriminating between a jamming situation and an out of service-situation. This kind of information can be signalized to a user. A user can be a person or an automatic environment like an alarm or a supervision environment, in particular in mobile entities like a car for instance. Thus, for instance a person driving a car can be warned that at a certain location no alarm or supervision function can be achieved by the user equipment be that it may be due to a jamming situation or be that it may be due to an out of service situation. As follow-up the information to the automatic or personalized periphery by means of the evaluation unit can be used to provide further measures which are adapted to the kind of loss of service availability. For instance other alarm or supervision functions can be activated. For instance the situation can be used to save energy by cutting off a process which is not of use in an out of service situation. In case of an out of service situation also a relocation can be suggested for another area which is an area of service, i.e. said another area according to a certain condition, like a check list or suggestion received from of a service or network provider, is not considered to be out of service; thus the alarm system is operative again in the area of service.

In a particular preferred development the unbiased received wide band power within the bandwidth of the communication user equipment receiver at the communication user equipment antenna connector is detected to be somewhat near a noise level. Of course the exact value of the unbiased received wide band power near the noise level depends on the receiver performance and the accuracy of the measurement. However, the receiver performance and the measurement accuracy or the like situation depend on uncertainties, which can be considered well by setting an adapted threshold amount.

Respective settings and information to the user can be adapted according to the particular situation. For instance a car can give an important information to the driver when leaving the car; e.g. the information that at an instant location no alarm function or supervision via mobile technology is possible, is valuable when detecting a jamming situation.

On the other hand, when detecting an out of service situation, a warning or information can be given to a person indicating that a supervision of a car via mobile technology is not possible due to the out of service situation. In both cases already the information as such is valuable for the receiving entity; e.g. a technical periphery or a person. Also already the information as such that a loss of service availability is due to an active jamming situation to the system or due to an out-of service situation, e.g. during parking in a sub-parking lot, is important for many applications.

In an out of service situation and in an jamming situation a biased parameter—in particular a biased ratio parameter like for instance an Ec/Io-value—is not or less detectable at a second later time. In particular in an out of service situation and in an jamming situation a biased ratio parameter will be expected to be less than X dB above noise flow (−24 dB above). However, discriminating between both cases of a jamming situation and an out of service situation is possible by checking whether the wide band power has increased or decreased.

A power parameter is considered as any parameter significant for a power. This, of course comprises a physically measurable power quantity itself, but also comprises any other value which is of use to denote quantitatively the power quantity. In particular the parameter not necessarily needs to have the metric unit of a power but can be a dimensionless quantity, in particular a ratio or logarithmic or bit-value or other value, which is suitable to quantitatively describe the physical power quantity.

In particular the meaning of power is to be understood broadly and also comprises the meaning of energy. A preferred understanding of power is power spectral density (PSD) according to the standard, whereas the units of power spectral density (PSD) are extensively and of broader use in this application. Generally a PSD is a function of power versus frequency and when integrated across a given bandwidth (like a channel e.g.); the function represents the mean power in such a bandwidth. When the mean power is normalised to (divided by) the chip-rate it represents the mean energy per chip. Some signals according to the standard are directly defined in terms of energy per chip, (DPCH_$E_C$, $E_C$, OCNS_$E_C$ and S-CCPICH_$E_C$) and others defined in terms of PSD ($I_O$, $I_{OC}$, $I_{or}$ and $\hat{I}_{or}$). There also exist quantities that are a ratio of energy per chip to PSD (DPCH_$E_c/I_{or}$, $E_c/I_{or}$ etc.). This is the common practice of relating power and energy or the like magnitudes in communication systems. It can nevertheless be seen that if both energy magnitudes in the ratio are divided by time, the ratio is converted from an energy ratio to a power ratio, which is more useful from a measurement point of view. It follows that an energy per chip of X dBm/3.84 MHz can be expressed as a mean power per chip of X dBm. Similarly, a signal PSD of Y dBm/3.84 MHz can be expressed as a signal power of Y dBm.

In a particular preferred development the received power is measured in a serving downlink channel. Particular preferred are a CPICH channel (common pilot channel) and/or a DPCH-channel (dedicated physical channel); but also other downlink channels are advantageous used for measuring a received power. It is to be understood, that the meaning of channel comprises any range or band of frequencies between an upper frequency and a lower frequency within a communication frequency band (FB I-XIX), which is suitable to form a mobile communication, in particular in a downlink connection. In a particular preferred development the available communication frequency bands (FB I-XIX) comprise all UMTS communication frequency bands. In particular the method comprises detecting a jamming transmitter affecting a communication user equipment, wherein said communication user equipment (UE) and a number of base node stations (BNS) are components of a cellular global system of mobile communication (GSM) based radio network (RN).

A loss of service availability in particular comprises an out of service status of the user equipment which arises from being in an "out of service area" as indicated in the introduction. The out of service status can arise from being in an area which is in principle covered by an UTRA cell, but wherein the area however cannot receive a suitable UTRA carrier. Such areas can lead to the above exemplified out-of-coverage situation with out of service status but basically within a coverage of an UTRA cell are denoted as out of service areas. E.g. such areas are known to exist in underground car parks or underground tracks of a subway. Another kind of out of service status can arise from being in an area which is in principle not covered by an UTRA cell, thus the out of service status arises from a loss of coverage of a suitable UTRA carrier.

These and other developed configurations of the invention are further outlined in the dependent claims. Thereby, the mentioned advantages of the proposed concept are even more improved.

A particularly preferred developed first variant of the instant invention starts from a method of detecting a jamming transmitter affecting a communication user equipment, wherein
  said communication user equipment (UE) and a number of base node stations (BNS) are components of a cellular code division multiple access (CDMA) based radio network (RN), wherein:
  a communication signal unit (SU) is correlated with a pseudonoise spread code (SC) in a serving cell coverage area (CA) of a serving base node station (sBNS) and transmitted as a pseudonoise chip (CHI) in a multiple shared communication frequency channel spectrally located between an upper frequency and a lower frequency of a communication frequency band (FB I-XIX) and
  the pseudonoise spread code (SC) is received by the communication user equipment (UE) as a serving pseudonoise spread code (sSC) from said serving base node station (BNS) in a serving downlink channel (sCPICH).

According to the concept of the first developed variant the following steps are provided:
  measuring a set of cell selection criteria power parameters (S) in the communication link at a first earlier time (t1) and at a second later time (t2), the power parameters (S) comprising
  a band and/or channel biased ratio-parameter significant for the received power per chip (CHI) relative to a total received power at the communication user equipment (UE) antenna connector,
  a band and/or channel biased absolute-parameter significant for the received signal power for the pseudonoise spread code (SC) at the communication user equipment (UE) antenna connector,
  an unbiased received wide band power (RTWP) within the bandwidth of the communication user equipment receiver at the communication user equipment (UE) antenna connector
  verifying the conditions, that
  (a) the biased parameters are not detectable at the second later time (t2), and
  (b) the unbiased parameter at the second later time (t2) compared to the first earlier time (t1) has increased
  (c) the increased value of the unbiased parameter exceeds a basic noise floor (NF) by more than a threshold amount (X), wherein the threshold amount (X) is of adjustable magnitude sufficient for affirmation of a receivable pseudonoise spread code, in particular basically amounts to or exceeds a spread code gain value, in particular wherein the spread code gain value is 24 dB.

In particular preferred adaptation of the first developed variant a method of detecting a jamming transmitter affecting a communication user equipment is provided, wherein
  said communication user equipment (UE) and a number of base node stations (BNS) are components of a cellular code division multiple access (CDMA) based radio network (RN), in particular in a frequency division duplex (FDD) or time division duplex (TDD) mode, wherein a set of at least one base node stations (BNS) from said number of base node stations (BNS) are within reach of the user equipment (UE), wherein a communication link in a serving cell coverage area (CA) is provided between the communication user equipment (UE) and at least an assigned serving base node station (sBNS) of said set of at least one base node stations (BNS), wherein said communication link being adapted for transmitting a signal comprising multiple communication signal units between the communication user equipment (UE) and at least the serving base node station (sBNS).

Preferably a said communication signal unit (SU) is correlated with a pseudonoise spread code (SC) in the serving cell coverage area (CA) of the serving base node station (sBNS) and transmitted as a pseudonoise chip (CHI) in a multiple shared communication frequency channel spectrally located between an upper frequency and a lower frequency of a communication frequency band (FB I-XIX) and wherein the pseudonoise spread code (SC) is received by the communication user equipment (UE) as a serving pseudonoise spread code (sSC) of at least one pseudonoise spread code (SC) from said set of at least one base node station (BNS) in a serving downlink channel (sCPICH) of at least one downlink channel.

According to the preferred adaptation of the first developed variant the steps are provided:

measuring a set of power parameters in the communication link at a first earlier time (t1) and at a second later time (t2), the power parameters comprising:

(i) the EC/Io-ratio (CPICH_Ec/Io) formed by the received energy per pseudonoise chip (CHI) in the serving downlink channel (sCPICH) divided by the total received power spectral density at the communication user equipment (UE) antenna connector; and/or (ii) the received signal code power (CPICH RSCP) in the serving downlink channel for the pseudonoise spread code at the communication user equipment (UE) antenna connector;

(iii) and additionally the unbiased received wide band power (RTWP) within the bandwidth of the communication user equipment receiver at the communication user equipment (UE) antenna connector.

Preferably the conditions are verified, that (a) the EC/Io-ratio (CPICH_Ec/Io) of the received energy per pseudonoise chip in the serving downlink channel (CPICH) divided by the total received power spectral density and the received signal code power (CPICH RSCP) in the serving downlink channel (sCPICH) for the pseudonoise spread code (SC) are not detectable at the second later time (t2), and (b) the unbiased received wide band power (RTWP) at the second later time (t2) compared to the first earlier time (t1) has increased (c) the increased value of the unbiased received wide band power (RTWP) exceeds a basic noise floor (NF) by more than a threshold amount (X).

The first preferred developed variant of the instant invention starts from the consideration that the user equipment per se and without further measures cannot distinguish between a normal mode frequency disturbance and a jamming frequency disturbance—in the CDMA based radio network a user equipment is obliged to change a pseudonoise spread code, once a frequency disturbance becomes effective rather than sticking to one and the same pseudonoise spread code.

This consideration leads the invention to the conclusion that once a jamming action becomes effective the user equipment will loose the pseudonoise spread code, which is essential for transmitting and receiving messages.

In cellular CDMA based radio networks the pseudonoise spread code is received by the communication user equipment from a base node station in a downlink channel also denoted as common pilot channel (CPICH). The CPICH channel is a downlink channel broadcast by a node B with constant power and of a known bit sequence, here denoted as pseudonoise spread code. Its power is usually between 5% and 15% of the total node B transmit power. A common CPICH power is 10% of the typical total transmit power of 43 dBm. The CPICH channel thus is used by the user equipment for a first complete identification of a primary scrambling code used for scrambling a signal unit to be transmitted or received from the node B. A contemporary CPICH is e.g. transmitted using a spreading code 0 with the spreading factor of 256. The CPICH contains 20 bits of data, which are either all zeros or can be employed as a pattern of alternating ones and zeros. Once the scrambling code for a CPICH is known, the channel can be used for measurements of signal quality, usually comprising a set of cell selection criteria power parameters like RSCP and Ec/Io. They are most properly described in 3GPP TS25.133. Definitions and abbreviations or the like are known from 3GPP TS25.215. In particular, in chapter 4.2.2.1 of TS 25.133 an "out of coverage"-situation is defined using the cell criteria for power parameters as defined in the instant claims.

The first selection criteria power parameter is a band and/or channel biased ratio parameter, namely the Ec/Io-ratio (CPICH_Ec/Io) formed the received energy per pseudonoise chip (CHI) in the serving downlink channel (sCPICH) divided by the total received power spectral density at the communication user equipment antenna connector.

A further band and/or channel biased absolute parameter is specifically the received signal code power (CPICH RSCP) in the serving downlink channel for the pseudonoise spread code at the communication user equipment antenna connector.

In the case if the user equipment has evaluated for a consecutive number of cycles, that the serving cell does not fulfil the cell selection criterion, e.g. in form of Ec/Io and RSCP conditions the user equipment shall initiate the measurements for all neighbouring cells. In the case such measurements also fail to fulfil the cell selection criterions finally after a certain period of time the user equipment is considered to be out of service area.

Based on these considerations, the instant first developed variant of the invention has realized that for an effective jamming detection it is further necessary to measure an unbiased received wide band power within the bandwidth of the communication user equipment receiver at the communication user equipment antenna connector.

Based on the above mentioned three power parameters, the concept of the first developed variant of the invention proposes to verify three conditions which are sufficient to reliably detect a jamming transmitter action affecting the communication user equipment. The main concept proposed by the first developed variant of the invention is to verify the conditions (a), (b), (c) as defined in claim 1 and 8 or 11. In particular, the basis is to verify that the biased parameters are not detectable, whereas the unbiased parameter has increased. The main concept proposed by the first developed variant of the invention is to provide a concept of relative measurement, wherein the set of cell selection criteria power parameters in the communication link are measured at a first earlier time and at a second later time. This concept relies on the idea that an absolute measurement of power parameters or predefined threshold values are of negligible significance in a CDMA based radio network. Instead relative conditions like the comparison of a situation at a first earlier time and a second later time is important according to the invention.

Additionally, a further key concluding condition of the concept of the first developed variant of the invention is given by verifying that the increased value of the unbiased parameter exceeds a basic noise floor by more than a threshold amount. Essentially, the threshold amount is not fixed or predefined but of adjustable magnitude sufficient for affirmation of a receivable pseudonoise spread code.

The first developed variant of the invention has realized, that in the case an unbiased received wide band power exceeds a basic noise floor according to the standard a pseudonoise spread code should by receivable. Thus, e.g. the Ec/Io ratio or the received signal code power in the CPICH should be detectable. Therefore, once the conditions (a), (b) and (c) as defined in claim 1 and 8 or 11 are all fulfilled, the only possibility remains that a jamming transmitter is affecting the communication user equipment. In particular, the concept of the invention relies on the relative situation between a first earlier and a second later time. The state of loss of the serving base node station at the second later time although the unbiased received wideband power has increased is a relative criterion comparing the situation to a first earlier time, thus adapted to the CDMA based technology.

The concept of the invention thus directs away from absolute measures or predefined threshold values. As compared to common place measures, a variety of advantages are achieved by the concept proposed by the first developed variant of the invention adapted to a CDMA based radio network. In particular, the concept also allows for further developments of the adjustable magnitude of the threshold amount for affirmation of a receivable pseudonoise spread code. Thus, the concept is adaptable to a variety of types of scramblers and scrambling codes. The type of scrambler and type of scrambling codes may vary depending on the specific type of cellular CDMA based radio network. However, once the scrambling code for a CPICH is known, the adjustable magnitude can be provided as for instance the threshold amount of a spread code gain value, which is based on a spreading factor of 256 and thus results in a spread code gain value of 24 dB.

Also the concept of the first developed variant of the invention has the advantage that it is extendable to a broad frequency range. Also the concept can be used for a warning concept, which indicates the approach of a jamming transmitter.

In particular the set of at least one base node stations is an active set of base node stations. The set of cells whose signals are used during a soft handoff in the standard is referred to as the active set. If a so called search finger finds a sufficiently strong signal in terms of high Ec/Io or RSCP from a new cell, this cell is added to the active set. Thus, the cells of the active set are checked more frequently than the rest. Thus, a handoff with a neighbouring cell within the active set is more likely. In the preferred embodiment, the active set comprises at least the serving base node station and/or a base node station with a strongest Ec/Io ratio and/or strongest RSCP. Thus, advantageously in a further prepared development the method of detecting can be made even more reliable by further verifying the conditions of the concept with regard to the strongest cell.

In a further preferred embodiment, the further condition that the bias parameters are not detectable at the second later time—as referred to as (a), (aa), (aaa) or (aaaa) conditions in claims 13 to 16 can be extended for any of the at least one downlink channels in the communication frequency channel. I.e. the concept can be extended within the whole 5 MHz frequency channel and also to a frequency band or number of all frequencies bands. In particular, also all frequency bands of the UMTS communication frequency bands can be implemented. In particular, also the communication user equipment can be part of a cellular global system of mobile communication, thus may rely on a combination of UMTS and GSM anti-jamming measures. Here the embodiments of WO 2007/019814 incorporated by reference for GSM-anti-jamming measures in this application.

In a particular preferred developed configuration, the concept of the invention may also comprise verifying a further condition for warning a jamming transmitter affecting a communication user equipment. These and further preferred developments are outlined in the method claims 17 to 19. Basically, in the so called (d)-condition in the claims the biased parameters are still detectable at the second later time, but each is significantly decreased. Thus, the so called (d)-condition is verified before verifying the so called (a)-condition of the concept of the invention. For instance, this applies to a case where the pseudonoise spread code is still detectable at the second later time but the Ec/Io ratio and the receipt signal code power RSCP are each decreased by more than 90% compared to the first earlier time. The development provides an effective concept for warning of a jamming transmitter once the conditions (d), (b) and (c) are fulfilled. As a result, the concept of the development allows to submit a message warning or indicating that a jamming transmitter is affecting the communication user equipment. In particular, a warning level can be made dependent on the amount of decrease of the bias ratio parameters. Also, the warning level can be made dependent on the magnitude of a threshold amount. Also the warning level can be made dependent on the exceeding amount of wideband power over noise floor. For instance the larger the decrease of biased parameters and the larger the increase of unbiased parameters at the second later time is compared to the first earlier time, than the higher the warning level shall be. Also the warning level should increase with increasing threshold amount.

In a particular preferred embodiment in case of a jamming action a warning or alarm message can be present in the user equipment itself. Preferably, the warning or alarm message can be also provided remotely from the user equipment; for instance by an evaluation unit which interfaces to the user equipment. Such evaluation unit can provide an application configured to execute the concept of the invention as described above.

For instance, the evaluation unit can be an evaluation program starting in a memory. In particular, the evaluation unit is part of an application and alarm signal estimated by the application. For instance, the alarm signal can be transmitted via an antenna, which is spaced apart from the user equipment and has means of connection via the cellular radio network. In particular, a computer or the like can be connected to the cellular radio network and processes the transmission of alarm signals.

A particular preferred concept of such remote activation of an alarm message is best described in the embodiments of WO 2007/019814 in principle which is incorporated by reference for this purpose in this application.

A preferred developed second variant of the instant invention starts from the consideration that the out of service situation affecting a communication user equipment demands that the unbiased parameter at the second later time as compared to the first earlier time as decreased. In this case it can be indicated that an out of service situation is affecting a communication user equipment. In particular the indication can be given to an application layer of an evaluation unit.

An exemplifying set of threshold values for a threshold amount (24 dB) and a noise level (−105 dBm) is given in the following table.

|  | Jamming detection | | OOS detection | |
| --- | --- | --- | --- | --- |
|  | T1 | T2 | T1 | T2 |
| CPICH_Ec/Io | X (>−24 dB) (−11 dB) | ≤−24 dB (−24 dB) | X (>−24 dB) (−11 dB) | ≤−24 dB (−24 dB) |
| RTWP | Y (>−105 dBm) (−80 dBm) | >>−105 dBm (−40 dBm) | Y (>−105 dBm) (−80 dBm) | ≤−105 (−111 dBm) |

In a particular preferred development a jamming situation can be discriminated from an out of service situation by verifying that at a second later time T2 the biased ratio parameter is well below −24 dB rather than lying below or near −24 dB; the latter weaker criterion tends to indicate an out of service situation whereas the stronger criterion of significantly less or no detection indicates a jamming situation. In particular a discrimination between a jamming detection and an out of service detection is possible by checking at a second later time that the unbiased (i.e. total) received wide band power (RTWP) clearly exceeds −105 dBm (when for instance a value of −40 dBm or the like is measured) rather than lying well below −105 dBm (when for instance a value of −111 dBm or the like is measured). The latter tends to indicate an out of service situation as the unbiased received wide band power RTWP is more or less below a noise level (in the above example −105 dBm) whereas a jamming situation would indicate a drastic increase of unbiased received wide band power.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further the features described in the description, the drawing and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does exclude a plurality.

BRIEF DESCRIPTION OF THE DRAWINGS

In the drawing:

FIG. 2A is a graphic illustrating the correlation of a pseudonoise spread code SC with a communication signal unit SU to provide a pseudonoise chip CHI in a multiple shared communication frequency channel;

FIG. 2B illustratively symbolizes a base node station staple power for a user equipment in a 5 MHz frequency band, i.e. representing the CDMA code staple method of the radio network of FIG. 1;

FIG. 2C illustrates the same situation as shown in FIG. 2B, however, including also a jamming power on top of the base node station staple power of FIG. 2B measured by the user equipment in a 5 MHz frequency band;

DETAILED DESCRIPTION

Figure 1:
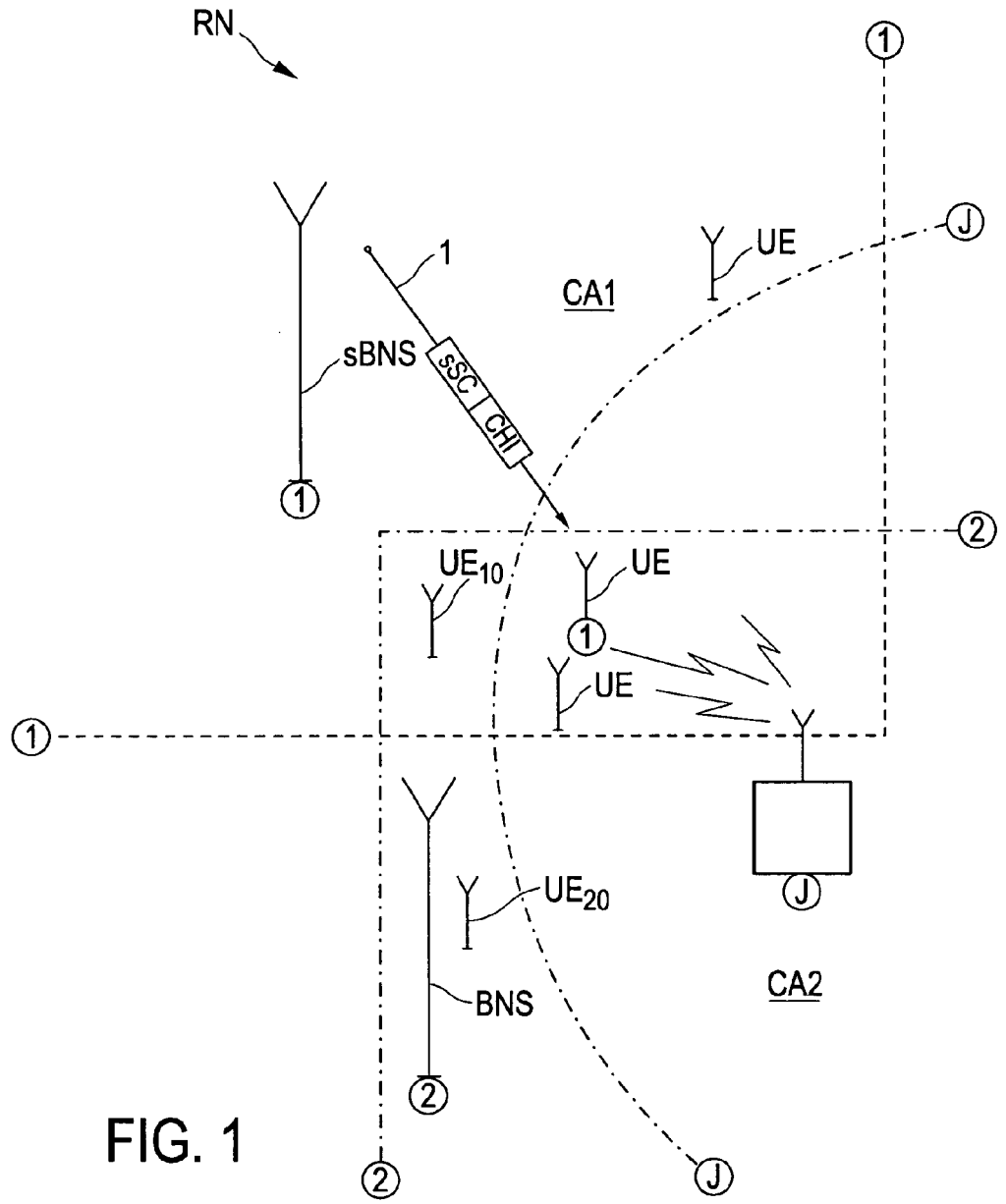
FIG. 1 shows a simplified symbolic graphic of a structure of a CDMA based radio network.

FIG. 1 shows in principle a cellular code division multiple access (CDMA) based radio network RN. The radio network RN allows for several transmitters—here referred to as a user equipment UE—to send information simultaneously over a single communication channel. This allows several user equipments UE to share a bandwidth of different frequencies. The CDMA based network can employ a spread spectrum technology and a special coding scheme—for instance a frequency division duplex FDD or time division duplex TDD mode can allow multiple users to be multiplexed over the same physical channel. The spread spectrum signalling has a much higher data bandwidth than the data being communicated. The CDMA based radio network RN provides a set of at least one base node station—here for instance the serving base node station sBNS and the further base node station BNS, which are within reach of the user equipment UE. For instance a communication link 1 in a serving cell #1 coverage area CA1 of the sBNS #1 is provided between the communication user equipment #1 and the assigned serving base node station sBNS #1. As the user equipment UE #1 is also in the cell coverage area CA2 of the base node station BNS #2, the base node station BNS #2 and the serving base node station sBNS #1 form an active set of base node stations, which are both in reach of the user equipment UE #1. In the present embodiment the sBNS #1 has the strongest communication link 1.

The communication link 1 is adapted for transmitting a signal comprising multiple communication signal units SU between the communication user equipment UE #1 and the serving base node station sBNS #1. As exemplified in FIG. 2A the communication signal unit SU forms the input of a scrambling code operation, wherein the signal unit SU is correlated with a pseudonoise spread code sSC in the serving cell coverage area CA1 of the serving base node station sBNS #1. The output signal of the scrambling code operation is a so called pseudonoise chip CHI formed by the scrambling encryption manipulating the original signal unit SU by means of the serving scrambling code sSC. This can be performed either by an additive or multiplicative scrambling operation as in principle known in the art.

As a result, the pseudonoise chip CHI is transmitted in a multiple shared communication frequency channel as indicated in the communication link 1 of FIG. 1 and can be transmitted or received by the user equipment UE #1 only when the serving pseudonoise spread code sSC is known by the user equipment UE #1. Once, the scrambling code SC, i.e. the pseudonoise spread code is known, a signal unit can be received or transmitted by the user equipment UE #1.

The pseudonoise spread code SC is received by the communication user equipment UE #1 as a serving pseudonoise spread code sSC as shown in FIG. 1 in a so called serving down link channel sCPICH. The CPICH contains 20 bits of data, which are either all zeros or in the case that space time transmit diversity is employed is a pattern of alternating ones and zeros for transmissions on the sBNS second antenna. The first antenna of a base node station always transmits all zeros for a CPICH. The CPICH downlink channel has a constant power and is of a known bit sequence. Its power is usually between 5% and 15% of the total BNS transmit power. A common CPICH power is of 10% of the typical total transmit power of 43 dBm. The CPICH can be used for measurements of signal quality.

In the instant embodiment, a jammer affects the user equipment UE #1 by interfering with the multiple shared communication frequency channel as located in a communication frequency band. Frequency bands FBI to FBIXX are known, each having a bandwidth of approximately 60 MHz. Each frequency band comprises several communication frequency channels, each having a bandwidth of 5 MHz. For each frequency channel, therefore the noise floor of 110 dBm can be defined based on a relative noise of 174 dBm/Hz.

As shown in FIG. 2B, a staple power for an out of jamming region user equipment UE #10 is a piled up staple with a rather small amount of CPICH power, a larger amount of signal code power dedicated to the user equipment and a main portion of shared signal power. The latter is used by several user equipments in the same 5 MHz bandwidth of the communication frequency channel. Nevertheless, information can be retrieved for each user equipment according to the pseudonoise spread code provided by the serving base node station and also the further base node station to each of the user equipments.

Once the number of user equipments changes in a coverage area CA1 of the service base node station 1 the shared signal power may vary rather often. However, as the serving pseudonoise spread code SSC is available for the user equipment UE #10 even upon variation of the shared signal power, user equipment UE #10 can uphold the communication link to the serving base node station sBNS #1. The reason for this is that even upon variation of the shared signal power nevertheless the CPICH power can be detected by the user equipment UE #10. The CPICH power normally is located not more than 24 dBm below the upper level of the staple power. Thus, due to the spread code gain value of instantly 24 dBm CPICH power and pseudonoise spread code SC can be detected by the user equipment UE #10 during normal operation.

In the case the distance between serving base node station sBNS #1 and user equipment UE #10 is diminished like for instance the distance between sBNS #1 and UE10 the cell selection criteria power parameters Ec/Io ratio—in the standard denoted as CPICH Ec/Io as well as the received signal code power CPICH RSCP will increase—thus overall the signal quality will increase. However, in the case the distance between UE #10 and sBNS #1 is enlarged—for instance by moving to UE #20—the biased parameter Ec/Io, i.e. ratio CPIHC Ec/Io and the received signal code power CPICH RSCP of the sBNS #1 will decrease but instead of those of the BNS #2 will increase. Thus, upon a situation, the soft-handover may occur between sBNS #1 and BNS #2 by moving UE #10 to UE #20. This situation is described for instance in 3GPP TS25.133.

Distinct from those normal operation interferences in the communication frequency channels is the situation shown in FIG. 1 due to the presence of a jammer J. The presence results in a user equipment UE #1 received staple power as shown in FIG. 2C. Additional to the CPICH power the dedicated signal code and the shared signal power a large pile of jamming power on top of the staple power of FIG. 2B is detected by UE #1. As can be easily already seen from FIG. 2C, the CPICH power therefore is not anymore in the spread code gain and consequently cannot be detected anymore. This situation is to be distinguished from the out of range situation as described in TS25.133 chapter 4.2.2.1. Namely, in the presently described situation of FIG. 1 and FIG. 2C the biased parameters are not detectable whereas the unbiased parameters have increased. The increase is due to the jamming power of jammer J. In the "out of service area" situation the unbiased parameters decrease as the biased parameters also decrease.

Consequently, according to the concept of the invention this situation can be used to provide an effective concept of detecting a jamming transmitter affecting the user equipment UE #1 when also an unbiased received wideband power within the bandwidth of the communication user equipment receiver at the communication user equipment UE #1 antenna connector is measured. Upon verifying the condition that the biased parameters—namely the Ec/Io and RSCCI—are not detectable and the unbiased parameter has increased a first indication of a jamming transmitter is given. However, to consolidate this finding a third condition has to be met according to the concept of the invention.

Figure 3:
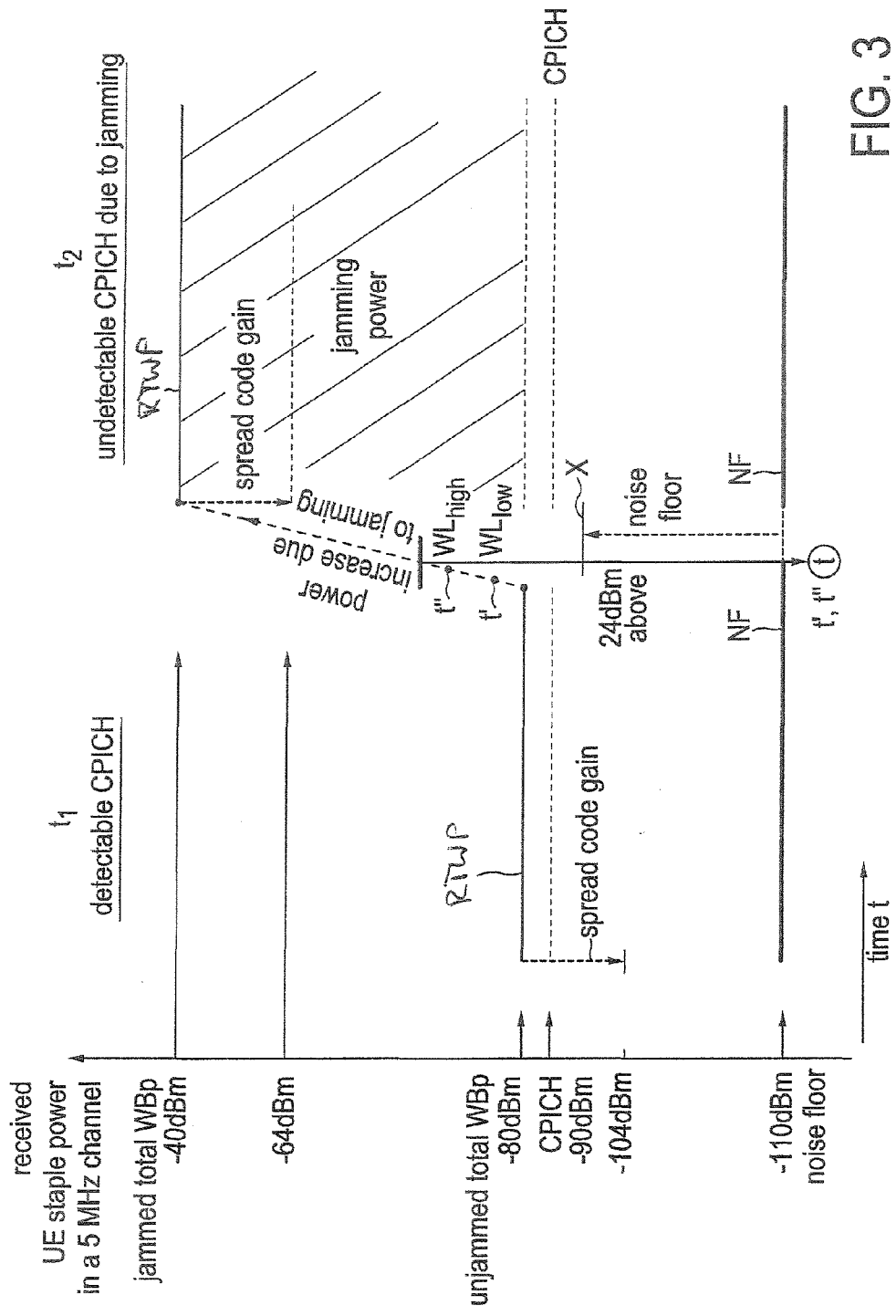
FIG. 3 illustrates more quantitatively an exemplifying situation showing the user equipment staple power at a first earlier time and the second later time with a detectable CPICH as compared to an undetectable CPICH due to jamming.

As best retrieved from FIG. 3, it is to be verified that the increased value of the unbiased parameter exceeds a basic noise floor by more than a predefined threshold amount X wherein the threshold amount X is of adjustable magnitude sufficient for affirmation of receivable pseudonoise spread code. In the present case, the pseudonoise spread code gain value has a magnitude of 24 dBm.

The left-hand side of FIG. 3 corresponds to an earlier time $t_1$ reflecting quantitatively the situation already shown in FIG. 2B. The right-hand side of FIG. 3 reflects a second later time corresponding quantitatively to the situation shown in FIG. 2C. Thus, FIG. 3 reflects e.g. moving from UE #10 to UE #1. The noise floor in FIG. 3 for both cases is located at 110 dBm corresponding to 174 dBm/Hz and a 5 MHz frequency band FBI—presently, the frequency band FBI has an uplink frequency between 1920-1980 MHz and the downlink frequency between 2110-2170 MHz, the duplex distance is 190 MHz and a channel width is 5 MHz.

At an earlier point of time $t_1$ the CPICH is still detectable and the CPICH power is located roughly at −90 dBm, thus 10 dBm below the total wideband power WBp shown for the unjammed situation at −80 dBm. Thus the CPICH channel power is within the spread code gain of −24 dBm. A CPICH power could be even detected down to −104 dBm. The situation changes when the unbiased received wideband power WBp within the bandwidth of the communication user equipment receiver at the communication user equipment UE #1 antenna connector is increased due to the jamming power of the jammer J. This situation is shown at a later time $t_2$, wherein the CPICH is no more detectable due to jamming. As outlined already, the biggest received wideband power WBp at the second later time $t_2$ compared to the first earlier time $t_1$ has increased as shown by the dashed arrow between the left-hand side and the right-hand side of FIG. 3. Thus, the condition (b) of the claims and as shown above is positively verified. Furthermore, the increased value of the unbiased received wideband power WBp exceeds a basic noise floor NF by more than the threshold X, namely by more than the spread code gain value of 24 dBm. Thus the condition (c) of the claims is met. On the other hand, neither an Ec/Io ratio nor a RSCP received signal code power can be detected as the CPICH power at −90 dBm is far below the wideband power minus the spread code gain—namely far below −64 dBm. Thus the condition (a) listed in the claims is also positively verified.

Consequently, the situation at later time $t_2$ is a jamming situation. Also FIG. 3 right-hand side shows that the approved condition (c) as mentioned above indeed is necessary. In the case the increased value of the unbiased received wideband power would be less than 24 dB over noise floor this could still result from an out of service area situation at time $t_1$ and time $t_2$.

In a further embodiment not shown here, a warning can be outputted by submitting an indicating jamming message from the user equipment UE #10 to an application and in particular still to any of the set of at least one base node station as long as the wideband power WBp is below the double slash on the dashed arrow in FIG. 3. In this case, it is to be assumed that the biased parameters—namely Ec/Io and RSCP—in the serving downlink channel sCPICH for the pseudonoise spread code is still detectable at a later time t between $t_1$ and $t_2$. But nevertheless each is significantly decreased, for instance decreased by more than 90% compared to the first earlier time $t_1$. In this case a warning level can be given depending on the exceeding amount of the wideband power over noise floor NF. For instance a low warning level $WL_{low}$ can be given at time t' and a high warning level $WL_{high}$ can be given at time t". At later time wherein the wideband power $WB_p$ is beyond the double flash the CPICH power is no more within the spread code gain and jamming is interrupting the communication link of UE #1 to sBNS #1. In this case conditions (a), (b) and (c) are met and a jamming transmitter is affecting a communication user equipment UE #1. An indicating jamming message can be submitted from the user equipment UE #1 to an application and the application can further submit an alarm message. The alarm message can be conducted to other items of the network or controller stations.

The warning level can also be increased with the magnitude of the threshold amount X. For instance, a warning level can be predominantly high the lower the threshold amount is—in this case the spread code gain is rather low and jamming can interrupt a communication link more effectively than in the case where the threshold amount is high.

The aforementioned embodiment of the invention in particular relates to a method of detecting a jamming transmitter affecting a communication user equipment, wherein said communication user equipment UE and a number of base node stations BNS are components of a cellular code division multiple access CDMA based radio network RN, wherein:

a communication signal unit SU is correlated with a pseudonoise spread code SC in a serving cell coverage area CA of a serving base node station sBNS and transmitted as a pseudonoise chip CHI in a multiple shared communication frequency channel spectrally located between an upper frequency and a lower frequency of a communication frequency band FB I-XIX and the pseudonoise spread code SC is received by the communication user equipment UE as a serving pseudonoise spread code sSC from said serving base node station BNS in a serving downlink channel sCPICH.

Figure 4:
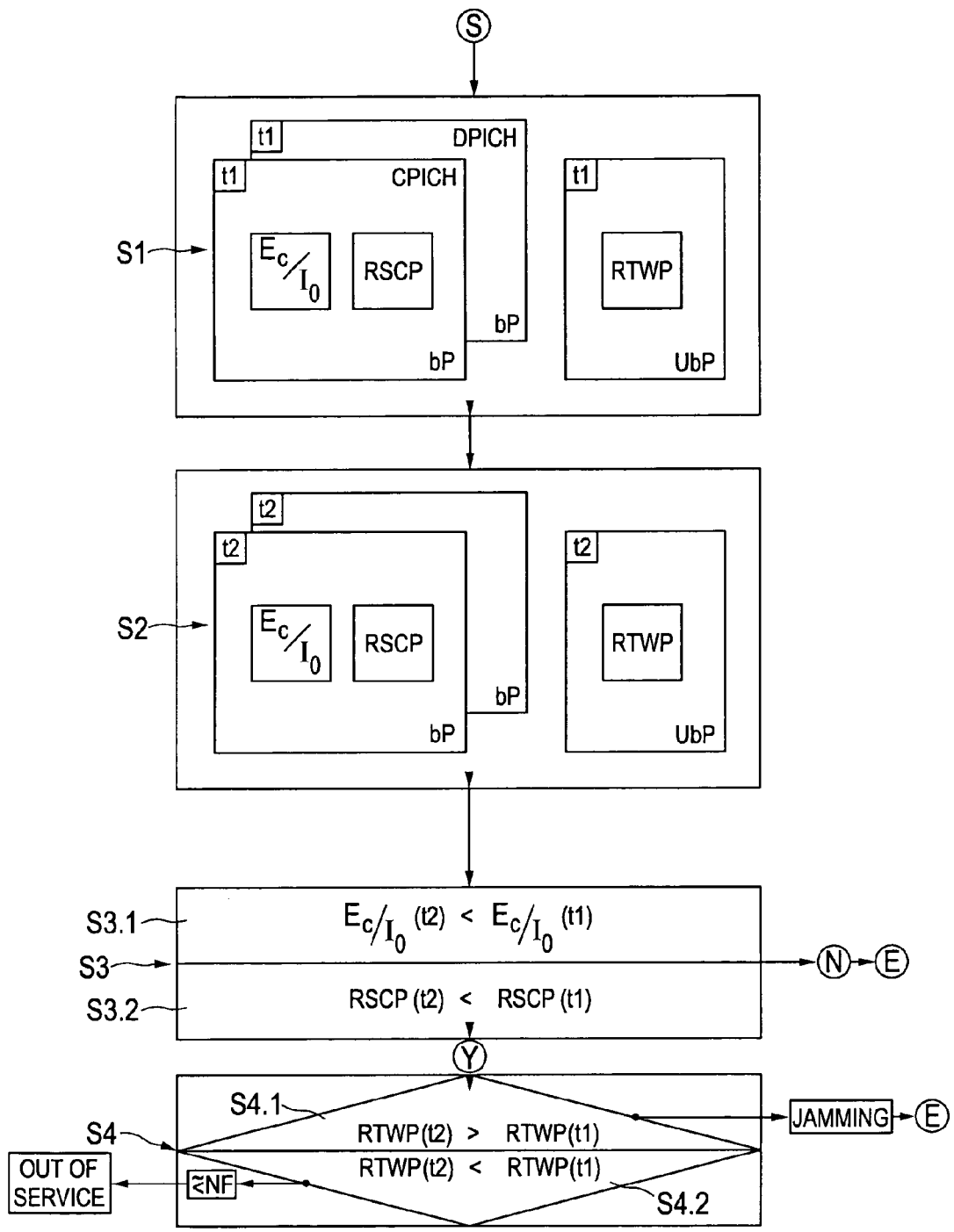
FIG. 4 is a flow chart illustrating a preferred embodiment of a method of detecting a loss of service availability affecting a user equipment, wherein according to the concept of the invention, a condition is provided for discriminating between a jamming transmitter affecting the user equipment and an out of service situation which is due to loss of coverage affecting the user equipment.

FIG. 4 shows a flow chart of a particular preferred embodiment of detecting a loss of service availability affecting a communication user equipment and discriminating between a jamming situation on the one hand and an out of service situation on the other hand.

Following a point of start (S) in a first step at a first earlier time t1 at least one channel biased parameter bP significant for the received power at the communication equipment antenna connector is measured and further an unbiased parameter ubP is measured within the bandwidths of the communication user equipment receiver at the communication user equipment antenna connector; in this case this is an unbiased received wide band (or total) power RTWP or Io within the defined receiver bandwidth.

In the instant embodiment two biased parameters bP are measured, namely a ratio parameter in form of an Ec/Io-parameter significant for the power per pseudonoise chip relative to a total power of the communication user equipment antenna connector. Further, an absolute parameter, namely an RSCP-parameter significant for the signal power at the communication user equipment antenna connector is measured as a biased parameter bP.

The instant embodiment provides two options for measuring the biased parameters bP of the aforementioned kind. One possibility is measuring the biased parameters bP in a common pilot channel CPICH wherein in a serving downlink channel the pseudonoise spread code is received by the communication user equipment from a base node station BNS.

Also, alternatively or additionally, a measurement of the biased parameters is possible in a serving downlink channel—here dedicated physical channel DPCH—wherein user data and/or control data are received by the communication user equipment from said serving base node station BNS. The dedicated physical channel in an uplink is used as a dedicated physical data channel DPDCH for transmission of the user data and as a dedicated physical control channel (DPCCH) for transmitting control data in logical separation. In the downlink the user and control data are received time or frequency multiplexed.

Measuring of the biased parameters bP in the CPICH as well as in the DPCH is advantageously possible to improve reliability of the method of detecting a loss of service availability; nevertheless measuring the biased parameters only in the CPICH or only in the DPCH alternatively is also possible and sufficient for giving a reliable discriminating statement for a jamming situation on the one hand or an out of service situation on the other hand. An exemplifying result of a measurement of the biased ratio parameter CPICH Ec/Io at the first earlier time t1 in the jamming situation and the out of service situation is given in the following table. Also as an example of an unbiased parameter ubP, a received total wide band power RTWP is given in the following table at the first earlier time t1. For details reference is made to the above general description part of this application.

|  | Jamming detection | | OOS detection | |
| --- | --- | --- | --- | --- |
|  | T1 | T2 | T1 | T2 |
| CPICH_Ec/Io | X (>−24 dB) (−11 dB) | ≤−24 dB (−24 dB) | X (>−24 dB) (−11 dB) | ≤−24 dB (−24 dB) |
| RTWP | Y (>−105 dBm) (−80 dBm) | >>−105 dBm (−40 dBm) | Y (>−105 dBm) (−80 dBm) | ≤−105 (−111 dBm) |

In a further step S2 the same measurement is repeated for a second later time t2. Corresponding values of a jamming situation on the one hand and an out of service situation on the other hand are given in the column t2 in the below table.

In step S3 following is a sequence of a first verifying step S3.1 and a second verifying step S3.2. In step S3.1 and step S3.2 the condition is verified that as compared to the first earlier time t1 the biased parameters bP are not or less detectable at the second later time t2. Thus, in the instant example, if in step S3.1 the Ec/Io-parameter and if in step S3.2 the RSCP-parameter at the second later time is below a corresponding value at the first earlier time t1 in the "yes"-path Y the system is able to indicate some kind of loss of service availability. On the hand, if the biased parameters bP still are detectable in sufficient strength in the "no"-path N the process can stop at a point of end (E) or can be repeated at the start point (S).

In a second verifying step S4 following the "yes"-path Y the condition is verified that the unbiased parameter ubP at the second later time t2 as compared to the first earlier time t1 has changed. In a first verifying step S4.1 the condition is verified that the unbiased parameter at the second later time t2 as compared to the first earlier time t1 has increased. In this case, the system is able to indicate a jamming situation. In a second verifying step S4.2 the condition is verified that the unbiased parameter at the second later time t2 as compared to the first earlier time t1 has decreased. Thus in the case the unbiased parameter ubP—here the received total wide band power RTWP—has decreased, the process can indicate an out of service situation as indicated in step S4.2. In the present embodiment for further confirmation of the out of service situation it is checked whether the received total wide band power RTWP is near or below the noise-floor.

From all points of end (E) the process can be repeated in an iteration, i.e. starting again from the point of start (S).

What is claimed is:

1. A method of detecting a loss of service availability, in particular detecting a jamming transmitter and/or an out of service situation, affecting a communication user equipment, wherein said communication user equipment and a number of base node stations are components of a cellular code division multiple access based radio network adapted for transmitting a signal comprising multiple communication signal units between the communication user equipment and a serving base node station, in particular in a frequency division duplex or time division duplex mode, wherein: a communication signal unit is correlated with a pseudonoise spread code in a serving cell coverage area of the serving base node station and transmitted as a pseudonoise chip in a multiple shared communication frequency channel spectrally located between an upper frequency and a lower frequency of a communication frequency band and comprising the steps of: measuring a set of power parameters at a first earlier time and at a second later time, the power parameters comprising a channel biased parameter significant for the received power at the communication user equipment antenna connector, an unbiased received wide band power within the bandwidth of the communication user equipment receiver at the communication user equipment antenna connector; and —verifying the conditions, (a) that as compared to the first earlier time the biased parameter is not or less detectable at the second later time, and (b) that the unbiased parameter has increased at the second later time as compared to the first earlier time it is indicated, that a jamming transmitter is affecting a communication user equipment, and/or that the unbiased parameter has decreased at the second later time as compared to the first earlier time it is indicated, that an out of service situation is affecting a communication user equipment.

2. The method according to claim 1, wherein the channel biased parameter significant for the received power at the communication user equipment antenna connector is measured in a serving downlink channel, in particular in a common pilot channel and/or a dedicated physical channel.

3. The method according to claim 1, wherein the pseudonoise spread code is received by the communication user equipment as a serving pseudonoise spread code from said serving base node station in a serving downlink channel, in particular in a common pilot channel; and/or in that user data and/or control data are received by the communication user equipment from said serving base node station in a serving downlink channel, in particular in a dedicated physical channel.

4. The method according to claim 1, wherein the channel biased parameter is a ratio-parameter, in particular an Ec/Io-parameter significant for the power per chip relative to a total power at the communication user equipment antenna connector.

5. The method according to claim 1, wherein the channel biased parameter is an absolute-parameter, in particular a received signal code power -parameter significant for the signal power at the communication user equipment antenna connector, in particular for the pseudonoise spread code and/or user data and/or control data, at the communication user equipment antenna connector.

6. The method according to claim 1, wherein verifying the conditions, comprises verifying that a biased ratio-parameter and a biased absolute-parameter are not detectable at the second later time.

7. The method according to claim 1, wherein verifying the conditions, comprises verifying that the unbiased parameter at the second later time compared to the first earlier time has increased or decreased.

8. The method according to claim 1, wherein verifying the conditions, comprises verifying the increased value of the unbiased parameter exceeds a basic noise floor by more than a threshold amount, wherein the threshold amount is of adjustable magnitude sufficient for affirmation of a receivable pseudonoise spread code, in particular basically amounts to or exceeds a spread code gain value.

9. The method according to claim 1, wherein for detecting a jamming transmitter affecting a communication user equipment, measuring a set of power parameters in the communication link at a first earlier time and at a second later time, comprises the power parameters: an Ec/Io-ratio formed by the received energy per pseudonoise chip in the serving downlink channel divided by the total received power spectral density at the communication user equipment antenna connector; and/or the received signal code power in the serving downlink channel, in particular for the pseudonoise spread code, at the communication user equipment antenna connector; and additionally the unbiased received wide band power within the bandwidth of the communication user equipment receiver at the communication user equipment antenna connector.

10. The method according to claim 1, wherein verifying the conditions, comprises verifying that an Ec/Io-ratio of the received energy per pseudonoise chip in the serving downlink channel divided by the total received power spectral density as compared to the first earlier time is not or less detectable at the second later time and/or as compared to the first earlier time the received signal code power in the serving downlink channel, in particular for the pseudonoise spread code, is not or less detectable at the second later time, and the unbiased, in particular, received wide band power at the second later time as compared to the first earlier time has changed, in particular increased or decreased, in particular wherein the increased value of the unbiased received wide band power exceeds a basic noise floor by more than a threshold amount.

11. The method according to claim 1, wherein said set of at least one base node stations is an active set of base node station comprising at least the serving base node station and/or a base node station with a strongest Ec/Io-ratio and/or strongest received signal code power in the active set.

12. The method according to claim 1, comprising further verifying the conditions (a) that the downlink channel with a strongest Ec/Io-ratio and/or strongest signal code power as compared to the first earlier time is not or less detectable at the second later time; (b) the unbiased received wide band power at the second later time compared to the first earlier time has increased with regard to said downlink channel with a strongest Ec/Io-ratio.

13. The method according to claim 1, comprising verifying the further condition, that an Ec/Io-ratio and the received signal code power (CPICH RSCP) as compared to the first earlier time is not or less detectable at the second later time for any of the at least one downlink channels in the communication frequency channel.

14. The method according to claim 1, comprising verifying the further condition, that an Ec/Io-ratio and the received signal code power as compared to the first earlier time is not or less detectable at the second later time for any of the at least one downlink channels in the communication frequency band.

15. The method according to claim 1, comprising verifying the conditions, that an Ec/Io-ratio and the received signal code power as compared to the first earlier time is not or less detectable at the second later time for any of the at least one downlink channels in all the available communication frequency bands.

16. The method according to claim 8, comprising
(d) an Ec/Io-ratio and/or the received signal code power in the serving downlink channels, in particular for the pseudonoise spread code, as compared to the first earlier time is still detectable at the second later time but each significantly decreased, in particular each decreased by more than 90%, compared to the first earlier time, in particular for any of the at least one downlink channels in the communication frequency channel.

17. The method according to claim 8, wherein in the case that the (a)—conditions and (b)—conditions, in particular (c)—condition, are met indicating that a jamming transmitter and/or an out of service situation is affecting a communication user equipment, in particular submitting an indicating jamming and/or an out of service situation message from the user equipment to an application.

18. The method according to claim 16, wherein in the case that the (d)—condition and (b)—condition, in particular and (c)—condition, are met, warning that a jamming transmitter and/or an out of service situation is affecting the communication user equipment, in particular submitting an indicating jamming and/or an out of service situation message from the user equipment to an application and/or to any of the set of at least one base node stations.

19. The method according to claim 18, comprising indicating a warning level for indicating the amount of impact caused by a jamming transmitter and/or an out of service situation affecting a communication user equipment wherein the warning level is depending on the exceeding amount of the wide band power over noise floor and/or the magnitude of the predefined threshold amount.

20. A user equipment configured to execute a method of detecting a loss of service availability, in particular detecting a jamming transmitter and/or an out of service situation, affecting the communication user equipment, wherein said communication user equipment and a number of base node stations are components of a cellular code division multiple access based radio network, in particular in a frequency division duplex or time division duplex mode, wherein a set of at least one base node stations from said number of base node stations are within reach of the user equipment, wherein a communication link in a serving cell coverage area can be provided between the communication user equipment and at least an assigned serving base node station of said set of at least one base node stations, wherein said communication link being adapted for transmitting a signal comprising multiple communication signal units between the communication user equipment and at least the serving base node station, wherein a said communication signal unit is correlated with a pseudonoise spread code in the serving cell coverage area of the serving base node station and transmitted as a pseudonoise chip in a multiple shared communication frequency channel spectrally located between an upper frequency and a lower frequency of a communication frequency band and in particular wherein the pseudonoise spread code is received by the communication user equipment as a serving pseudonoise spread code of at least one pseudonoise spread code from said set of at least one base node station in a serving downlink channel of at least one downlink channel further comprising: means for measuring a set of power parameters at a first earlier time and at a second later time, the power parameters comprising: a channel biased parameter significant for the received power at the communication user equipment antenna connector, an unbiased received wide band power within the bandwidth of the communication user equipment receiver at the communication user equipment antenna connector, verifying the conditions, that the biased parameter as compared to the first earlier time is not or less detectable at the second later time, and the unbiased parameter has increased at the second later time as compared to the first earlier time it is indicated, that a jamming transmitter is affecting a communication user equipment, and/or that the unbiased parameter has decreased at the second later time as compared to the first earlier time it is indicated, that an out of service situation is affecting a communication user equipment.

21. The user equipment according to claim 20, wherein in that the power parameters comprise: an Ec/Io-ratio formed by the received energy per pseudonoise chip in the serving downlink channel divided by the total received power spectral density at the communication user equipment antenna connector; and/or the received signal code power in the serving downlink channel, in particular for the pseudonoise spread code, at the communication user equipment antenna connector; and additionally the unbiased received wide band power within the bandwidth of the communication user equipment receiver at the communication user equipment antenna connector.

22. The equipment according to claim 20, comprising means for verifying the conditions, that an Ec/Io-ratio of the received energy per pseudonoise chip in the serving downlink channel divided by the total received power spectral density and/or the received signal code power in the serving downlink channel, in particular for the pseudonoise spread code, as compared to the first earlier time are not or less detectable at the second later time, and the unbiased received wide band power at the second later time compared to the first earlier time increased or decreased.

23. The user equipment according to claim 20, comprising means for verifying the condition, that (b) the unbiased received wide band power at the second later time compared to the first earlier time has increased or decreased by more than a threshold value of a spread code gain value, in particular −24 dB; preferably verifying the condition, that (c) the increased value of the unbiased received wide band power exceeds a basic noise floor by more than a threshold amount, in particular a threshold amount is 24 dB.

* * * * *